Aug. 7, 1973   L. H. BROERING   3,751,402
PROCESS FOR THE RECOVERY OF RUBBERY POLYMERS IN CRUMB FORM
Original Filed July 7, 1969

United States Patent Office 3,751,402
Patented Aug. 7, 1973

3,751,402
PROCESS FOR THE RECOVERY OF RUBBERY POLYMERS IN CRUMB FORM
Leo H. Broering, Fort Wright, Ky., assignor to National Distillers and Chemical Corporation, New York, N.Y.
Continuation of abandoned application Ser. No. 839,332, July 7, 1969, which is a continuation-in-part of application Ser. No. 815,723, Apr. 14, 1969, now Patent No. 3,535,296. This application June 1, 1971, Ser. No. 149,043
Int. Cl. C08d 5/02, 5/04
U.S. Cl. 260—82.1
15 Claims

ABSTRACT OF THE DISCLOSURE

A process is provided for the preparation of rubbery polymers in satisfactory crumb form that can be readily handled and processed, from polymer formed in a reaction solution in an inert, volatile, nonaqueous solvent, in the presence of an alkali metal catalyst which hydrolyzes in water to form an alkaline solution. The process comprises precipitating the polymer from the reaction solution in the presence of water by subjecting the polymer solution to steam-stripping to volatilize and remove unreacted monomer, volatile low polymer and solvent in the presence of an anionic surfactant and a nonionic surfactant and thereafter recovering the rubbery polymer crumb.

---

This application is a continuation of Ser. No. 839,332, filed July 7, 1969, and now abandoned, when in turn is a continuation-in-part of Ser. No. 815,723, filed Apr. 14, 1969, and patented Oct. 20, 1970, Pat. No. 3,535,296.

Much work has been done in recent years in developing new processes for the production of rubbery polymer materials. Generally the rubbery polymers are formed in solution in a nonaqueous, volatile, inert hydrocarbon solvent for both the monomeric reactants and the polymeric product. The rubbery polymer products must then be recovered from such solutions in a solid particulate form suitable for further processing. It is frequently convenient to remove the solvent by steam-stripping, whereupon the rubbery polymer is dispersed in a water slurry, in crumb form. The crumb must then be separated from the water, and dried.

A portion of the solvent and monomer can be flashed off from the rubbery polymer solution before the steam distillation stage, and the partially stripped product is then subjected to steam-stripping, or the reaction mixture can be subjected to steam-stripping directly.

The polymer crumb that is formed is frequently sticky, and difficult to handle, because it tends to agglomerate, forming large masses of polymer, and to stick to the stirrer and walls of the vessel. It has been suggested, in order to avoid this, that certain anionic surface active agents be added to the water before or during mixing with the polymer solution.

U.S. Pat. No. 3,042,637, to Crouch, dated July 3, 1962, proposes that an alkali metal lignin sulfonate be added to the steam-stripping zone prior to mixing with the hydrocarbon solution of the rubbery polymer.

Pat. No. 3,268,501 to Crouch et al., dated Aug. 23, 1966, proposes that an alkali metal salt of an alkyl sulfate or an alkyl benzene sulfonate be added to the steam-stripping zone.

U.S. Pat. No. 3,190,868 to Mitacek et al. dated June 22, 1965, describes a method for recovery of rubbery polymers from solutions thereof in the hydrocarbon solvents in which they were prepared, using organometal catalysts of the metals of Groups I, II and III; lithium, cobalt, titanium and aluminum are named, but not sodium. Such catalysts lead to formation of polymers that have a tendency to form a sticky crumb that is not dispersed in water. To overcome this, Mitacek et al. add to the aqueous phase a water-soluble derivative of a polymeric substance having a plurality of —COOH groups or precursors of —COOH groups, and a polyvalent metal ion, which is calcium, barium, strontium, aluminum, cobalt, iron or nickel, or mixtures thereof. The reason why a polyvalent metal ion is required is not explained by Mitacek et al., and possibly they did not known; it certainly is not apparent from the patent what the function of the polyvalent metal ion is.

Especially useful types of rubbery polymers are formed by polymerization in the presence of alkali metal organic compounds. One type of such rubbery polymeric materials are known as alfin polymers; these polymers are prepared using alfin catalysts, which are described by Morton and his co-workers, in their series of papers in the Journal of the American Chemical Society starting in 1947, as organoalkali metal catalysts for the polymerization of olefins and particularly dienes which are formed from the alkali metal derivatives of an alcohol and of an olefin plus an alkali metal halide. (See the Journal of the American Chemical Society 69 161; 167; 950; 1675; 2224 (1947). A summary of the work done up until 1950 is set forth in Industrial and Engineering Chemistry 42 1488–1496 (1950).) Other alkali metal catalyst used commercially in the preparation of rubbery polymers are sodium metal, organo-sodium catalysts, lithium metal, and organo-lithium catalysts.

When the catalyst-containing solutions of the polymers, prepared using these alkali metal-containing catalysts, are mixed with water in the steam-stripping process, the alkali metal components of the catalysts are hydrolyzed, forming alkali metal hydroxide, which raises the pH in the steam-stripping mixture to 10 or above. Under these highly basic conditions, the anionic surface active agents which have previously been proposed be added to the steam-stripping zone act as foaming agents; under high agitation during steam-stripping, the foam can reach a height of forty feet or more. The use of anionic surfactants becomes difficult if not impossible under such conditions.

In accordance with the present invention, it has now been determined that foam formation during steam-stripping and crumb formation of rubbery polymer reaction solutions containing alkali metal catalysts can be avoided and discrete, well-formed non-sticky crumb particles obtained by steam-stripping of the rubbery polymer solvent solutions in the presence of both an alkali metal salt of an organic anionic surfactant and an organic polyoxyalkylene glycol nonionic surfactant.

This invention is applicable to the preparation of rubbery polymer crumb in a batch process or in a continuous process. The present invention is especially valuable in continuous processes, where coping with the continuing formation of large volumes of foam would be particularly difficult and costly. Polyvalent metal ions serve no useful function in the process of this invention.

The rubbery polymers with which the present invention is concerned are generally prepared by polymerizing one or more polymerizable unsaturated compounds, of which, preferably, at least one is a conjugated diene, in a solution in an inert solvent and in the presence of an alkali metal catalyst.

The useful conjugated diene monomers include aliphatic dienes, such as 1,3-butadiene, isoprene, piperylene, and 3-methoxy-1,3-butadiene, 2,3-dimethylbutadiene-1,3, 2,3-dimethylpentadiene-1,3, 3,4-dimethyl pentadiene-1,3, 2,4-dimethyl-pentadiene-1,3, 2-neopentylbutadiene - 1,3, 2,3,4-trimethylpentadiene-1,3, hexadiene-1,3, 2-ethylbutadiene-1,3, 2-phenylbutadiene-1,3, 2,3-diphenyl butadiene-1,3, cyclohexadiene-1,3, cycloheptadiene-1,3, dimethylfulvene and other polymerizable methyl, ethyl, propyl, isopropyl substituted butadienes, pentadienes, hexadienes-1,3, hexadienes-2,4, including the cyclodienes; the heptadienes, the octadienes, the hexatrienes, the heptatrienes and the octatrienes, such as hexadiene-2,4, hexatriene-1,3,5, octatriene-2,4,6, octadiene-1,3, octadiene-2,4 and myrcene. The preferred dienes are the 1,3-dienes and those having 4 to 8 carbon atoms because of the ease of polymerization and the satisfactory polymer yields.

Other polymerizable unsaturated compounds containing carbon-to-carbon unsaturation which may be used include the aryl- and the alkaryl-substituted olefins such as styrene, the vinyl toluenes, alpha-methyl vinyl toluenes, the ethyl, propyl, isopropyl, butyl and disobutyl mono- and poly-substituted styrenes and alpha-methyl styrenes which can broadly be referred to as the alkyl vinyl benzenes, the vinyl biphenyls, the vinyl naphthalenes, allyl benzenes, allyl toluenes, allyl naphthalenes, stilbene, methyl stilbenes, indene-2, 2-diphenyl ethylene, triphenyl ethylene, the phenyl-substituted propylenes and butylenes.

Aryl-substituted olefins which may also be used are the halogenated aryl-substituted olefins, such as the mono-, di-, tri-, and tetra-, fluoro-, chloro-, and bromo substituted aryl and alkaryl olefins such as styrene, the vinyl toluenes, the various vinyl, ethyl, propyl, isopropyl benzenes and naphthalenes.

The preferred aryl alpha olefins are those having 2 to 6 carbon atoms in addition to the aryl or alkyl-aryl group and the alkyl of the alkaryl group is preferably from 1 to 4 carbon atoms. 1,3-butadiene and isoprene alone and combinations of butadiene and styrene and of butadiene and isoprene are preferred polymerizable unsaturated compounds.

These conjugated dienes also can be polymerized in admixture with one or more other polymerizable unsaturated compounds containing a vinyl grouping, and which are copolymerizable therewith; examples of these include acrylonitrile, methacrylate, methylethacrylate, vinyl chloride, methyl vinyl ether and the various olefins, especially the alpha-olefins such as ethylene, propylene, butene-1, isobutylene, pentene-1, hexene-1, heptene-1, octene-1 and the various methyl, ethyl, propyl, isopropyl, butyl and isobutyl substituted 4 to 6 carbon alpha olefins, as for instance 3-methylbutene-1, 3,3-dimethylbutene-1, 2,3,3 - trimethylbutene-1, 2,2,3,3 - tetramethylbutene-1, 2,4,4-trimethylpentene-1 and certain of the 2-olefins such as 2-methylbutene-2.

Halogenated olefins which may also be used are preferably, the fluoro-, chloro- or mixed fluoro-chloro- and in some instances the bromo-substituted olefins. The halogen may substitute mono-, di-, tri- or tetra-, that is, it may partially or completely displace the hydrogen of the olefins heretofore cited. Preferred halogenated alpha olefins have from 2 to 6 carbon atoms.

The reaction is carried out in a solution of the polymerizable unsaturated monomers in an inert nonaqueous volatile solvent such as the lower molecular weight alkanes, e.g., propane, butane, pentane, 2,3-dimethyl pentane, 2,4-dimethyl hexane, hexane, heptane and isooctane, cycloparaffins, such as cyclohexane and methylcyclohexane and aromatic compounds, such as benzene, xylene and toluene and can be carried out in nonhydrocarbon compounds such as cyclic ethers, such as dioxane, or chlorinated paraffins, such as carbon tetrachloride. The alkanes are generally preferred.

Generally, the catalyst is present in an amount of from about 0.1 to about 5% by weight, based on the weight of the polymerizable unsaturated monomer compound in the original reaction mixture. The polymerizable unsaturated monomer compound can be mixed with the solvent in a proportion of from about 1 to about 50% by weight of the solution; the concentration of the rubbery polymer product in the solvent is generally in the range of from about 1 to about 35% by weight.

Generally, the proportion of rubber and monomer in the hydrocarbon solvent is dependent upon the catalyst used, the type of process which has been carried out, i.e. continuous or batch process, and the monomer which is being polymerized. For example, in the alfin polymerization of butadiene, a 30% solution of butadiene is disclosed in Example 1 of U.S. Pat. No. 3,223,691 to Greenberg et al. In a continuous alfin polymerization process, a maximum of a 25% solution of the rubbery product should be obtained, and preferably from about 2 to about 15% by weight.

Alkali metal catalysts are hydrolyzable in water to form alkali metal hydroxide, and the amount of catalyst used is generally sufficient to give a basic solution having a pH of 10 or greater, and generally of from about 11 to 14. Such alkali metal catalysts include the metal itself, especially sodium and lithium metals.

Various types of oragnoalkali metal catalysts most of which are hydrolyzable to the corresponding hydroxide can be used in preparing rubbery polymer solutions which can be treated to recover a rubbery crumb according to the present invention. These catalysts can be multicomponent, i.e. containing a combination of catalytic agents, or can contain a single catalytic agent. Among the multicomponent catalysts are the alfin catalysts described above, which usually are organo-sodium compounds; however, they may also be prepared in a corresponding manner from potassium, rubidium or even cesium. The preparation of a multicomponent lithium catalyst corresponding in composition to the sodium alfin catalysts described by Morton et al. in the articles referred to, supra, is described in U.S. Pat. No. 3,317,918 to Foster, patented May 2, 1967. Examples of such organo-alkali metal catalyst components include lithium, sodium, potassium, rubidium and cesium compounds wherein the metal is linked to (a) radicals of the paraffinic type hydrocarbons such as, for example, methane, ethane, propane, butane, pentane, the isopentanes, hexane and the isohexanes; (b) of the olefinic type hydrocarbons such as, for example, ethylene, propylene, the butenes, isobutenes, the pentenes, the isopentenes, the hexenes and the isohexenes; (c) of the cyclo-paraffinic and cyclo-olefinic hydrocarbon type such as, for example, those derived from and including cyclopropane, cyclobutane, cyclopentane, cyclopentene, cyclohexane, and cyclohexene, isopropyl cyclohexene and the terepenes; (d) of the aromatic type hydrocarbons such as, for example, benzene, alkylbenzenes, biphenyl, alkylbiphenyl and other polyphenyls, the naphthalenes, including the alkylnaphthalenes such as the methylnaphthalenes; (e) of the paraffinic type hydrocarbons with aromatic substituents including the above cited paraffins substituted with the above cited aromatics such as, for example, methylbenzene, the xylenes, mesitylenes, ethylbenzene, the ethyltoluenes, the ethyl-xylenes, isopropylbenzene, the alkyl polyphenyl and the alkyl naphthalenes; (f) of the olefinic type hydrocarbons with aromatic substituents including the olefinics above substituted with the aromatics above such as, for example, phenyl ethylene, isopropenylbenzene, alpha-methyl styrene, the polyalphamethyl styrenes including especially the di-, tri-and tetra-alpha-methyl styrenes, the vinyltoluenes and diphenyl ethylene; and (g) of acetylene and its homologues including the aromatic acetylenes. Such radicals may contain further substituents provided the latter do not deleteriously affect the catalysts being prepared.

Catalysts often include, preferably in addition to the alkali metal hydrocarbon compounds, such as in the alfin catalysts, alkali metal derivatives of organic compounds having at least one reactive hydrogen atom, such as carboxylic acids, sulfonic acids, alcohols, phenols, mercaptans, thiophenols, enol-forming ketones, hydrogen cyanide, and hydrogen thiocyanate.

Examples of such compounds include butyl sodium, amyl sodium, allyl sodium, allyl lithium, sodium isopropoxide, sodium(1-methyl butoxide), $NaOCH(CH_3)C_6H_5$, phenyl lithium, tolyl and xylyl lithium, xylyl and tolyl sodium, $Na(CH_2=CHCHCH_2CH=CH_2)$, ethyl lithium, ethyl sodium, 2-ethyl hexyl lithium, 2-ethyl hexyl sodium, alpha- and beta-naphthyl sodium and alpha- and beta-naphthyl lithium, lithium isopropoxide, lithium butoxide, ethylene dilithium, ethylene disodium, pentamethylene dilithium, hexamethylene disodium, 1,3,5-trilithium pentane, and 1,3,5-trilithium sodium; and the dihydrocarbon amides of lithium and sodium, such as lithium diethyl amide.

For further examples of useful catalysts see British Pats. Nos. 812,971 and 963,307 and U.S. Pat. No. 3,317,918 to Foster.

The alfin catalysts are a three-component mixture comprising an alkali metal derivative of an alkenyl or of an alkyl aromatic compound, such as allyl sodium or tolyl sodium, plus an alkali metal derivative of an alkoxide, such as sodium isopropoxide, and a carrier, which is generally an alkali metal halide. The first two components are hydrolyzable in water to form alkali metal hydroxide.

A related type of catalyst contains an alkali metal compound of a diene in place of the alkenyl compound. The alfin catalysts and their related compounds are more fully described in the Morton et al. article referred to above, U.S. Pats. Nos. 3,067,187 to Greenberg et al. dated Dec. 4, 1962 and U.S. Pat. No. 3,380,984 to Birchall et al., dated Apr. 30, 1968.

Steam-stripping, generally, of a rubbery polymer in a nonaqueous solution from the polymerization reaction zone, provides for steam-distilling the nonaqueous solution admixed with water. The nonaqueous solution can be mixed with hot water, at a temperature above the flash temperature to flash off the volatile portions of the solution. Sufficient steam is then injected into the mixture of the water and nonaqueous solution to heat it at a high enough temperature to permit the distilling off overhead of the voltatiles, including solvent, and any monomer that may remain from the polymerization reaction. When the nonaqueous solution is mixed with water, if there are any alkali metals or their hydrolyzable compounds present, they will hydrolyze to the corresponding hydroxide, and, if an organoalkali metal catalyst is present in the nonaqueous solution, the free organic compound. The free organic compound is distilled off overhead with the volatiles.

The process of this invention is especially useful for the recovery of rubbery alfin polymers, and especially, as stated above, for alfin polymers produced by a continuous or batch process. This process is especially useful for the steam-stripping of alfin polymers, which are prepared from a catalyst that contains two organoalkali metal compounds and a metal salt; the alfin catalysts are hydrolyzed to form a strongly basic crumb slurry and the process of this invention is especially useful in preventing the formation of foam during steam-stripping. The steam-stripping of an alfin polymer solution in a continuous alfin polymerization process can proceed as shown below. The same process can also be utilized for the steam-stripping of a rubbery polymer solution prepared using catalysts other than alfin catalysts.

In this step, the alfin polymer is recovered as crumb from the reaction mixture, and any volatile materials are removed by flashing and a simultaneous steam-stripping. The operation is carried out in the presence of hot water. Volatile low polymer is also stripped. The alfin catalyst is hydrolyzed, and any olefin and alcohol released therefrom are removed as well, at this stage.

As the first stage in the steam-stripping, the alfin polymer solvent solution withdrawn from the polymerization zone is blended with hot water in the presence of an alkali metal salt of an organic anionic surfactant, and preferably, both an alkali metal salt of an organic anionic surfactant and an organic polyoxyalkylene glycol nonionic surfactant. The water is preferably at a temperature above the steam distillation temperature of the solvent or diluent to be stripped. This temperature will also be above the boiling point of monomer, catalyst alcohol and catalyst olefin. The water is held at this temperature (inasmuch as the alfin polymer reaction solution is continuously being blended therewith in a crumb former or solvent stripper) by injection of steam. Thus, a true steam distillation of the volatiles is obtained in combination with a very rapid flashing of volatiles, due to the heat of the water when the water and reaction solution are blended. The alfin polymer precipitates from the polymer solution as a wet finely divided crumb, which becomes suspended in the water.

The amount of water used is enough to form an alfin polymer crumb suspension containing from about 2 to about 10 weight percent crumb. The maximum crumb content is determined by the handling properties of the suspension.

The alfin polymer reaction solution is blended with the hot water continuously, and the volatiles are drawn off overhead while the alfin rubber crumb that becomes suspended in the water is continuously separated by screening or centrifuging. The solution can be blended with the water at one end of this zone, and the crumb removed at another end. One or several stages can be used, depending on equipment limitations. Conventional crumb formers or solvent stripper as used in the synthetic rubber industry are suitable.

The surfactants can be added to the alfin polymer reaction solution, to the hot water, or to the blend thereof. They can also be blended with the recycle water, or the make-up water and steam. The surfactants ensure formation of discrete well-formed, hard or nonsticky crumb particles that can be readily processed in the crumb-forming or solvent-stripping and in subsequent crumb-dewatering and crumb-drying steps without formation of foam during the steam-stripping.

The suspension of the polymer solution in water is sumultaneously subjected to steam-stripping. Steam distillation is effected at a temperature within the range from about 80 to about 120° C., as a result of which the suspension can be brought to the boiling point of water. Any volatiles that are not flashed off are steam-distilled out.

The steam-stripping step is normally carried out under atmospheric pressure. However, it may be desirable to employ sub or super atmospheric pressures, in order to achieve lower or higher stripping temperatures, and good crumb formation.

The time required to remove the volatiles depends to some extent on the amount and type of volatiles and the physical characteristics of the alfin polymer being processed. Usually, from about 2 to about 90 minutes are adequate. For example, an alfin copolymer of butadiene and styrene, containing from about 60 to about 98 weight percent of butadiene, can be recovered from solution in hexane wherein the polymer concentration is about 10%, as an essentially solvent-free rubber crumb, that is, containing less than about 0.5% hexane, by steam-stripping at a temperature of from about 200 to about 210° F. for about 3 minutes to a half hour.

If desired, as an alternative procedure, the alfin polymer reaction solution can first be subjected to a water-washing treatment, preferably passing the reaction solution and the wash water countercurrently to each other, thereby removing isopropanol and water-soluble salts, and facilitating the production of a polymer having an extremely low ash content. The washing step is not necessary in most cases, however. If it is used, it can be carried out by passing the alfin polymer solution and water countercurrently, and passing the wet polymer solution to a separation zone, where the water separates out as an aqueous phase containing water-soluble impurities, leaving the alfin polymer solution. The alfin polymer solution is then passed to the steam-stripping zone.

In a variation of the washing step, in order to ensure a substantially complete removal of water-soluble impurities from the polymer-solvent solution, a two stage or plural stage countercurrent washing can be used.

The volatiles overhead, including monomer, solvent, alcohol, olefin, moderator and water, are drawn off together. The solvent is separated from the monomer, alcohol and olefin by the usual condensation and fractionation techniques, and recycled to the polymerization stage. The monomer can be recovered and recycled, if desired. All are dried before recycling.

The organic anionic surfactant is characterized by a mixed hydrophobic-hydrophilic character, arising from the presence of a hydrophobic portion of relatively high molecular weight, and one or more hydrophilic —COOM, —OSO$_3$M or —SO$_3$M groups (M is an alkali metal), attached to the hydrophobic portion. There are two general types, classified according to whether the hydrophobic portion is aliphatic or aromatic in nature.

The aromatic anionic surfactants have an —SO$_3$M group attached to an aromatic ring, such as a benzene or naphthalene ring, and an aliphatic group can also be attached to the aromatic ring, desirably having a sufficiently long chain to impart a more hydrophobic character to the aromatic ring. Benzene rings may require longer chain aliphatic groups than naphthalene rings for high hydrophobicity; in the case of benzene, the aliphatic group has from about one to about thirty carbon atoms, preferably from twelve to eighteen carbon atoms, whereas in the case of naphthalene no aliphatic group is necessary, and, if present, the aliphatic group can have from one to twenty-four carbon atoms, preferably from four to twelve carbon atoms. The —SO$_3$M group is in the form of the alkali metal (sodium or potassium) salt. The ammonium salts can be used; these form the sodium salts in situ, upon liberation of e.g., sodium hydroxide from the alfin polymer and alfin catalyst in the presence of water; ammonia may be liberated, and driven off with the volatiles.

A special class are the polymeric polyaryl sulfonates, containing a polymeric chain of a molecular weight from upwards of 100 to 10,000 or more, preferably from 500 to 5,000, bearing aryl units such as benzene or naphthalene rings or both, as an integral part of the chain or as side groups. The aryl units are linked in a polymeric chain by linking groups, such as alkylene groups, for example, methylene, or oxygen groups, or are directly linked by condensation to each other, by single bonds, or are attached as substituents to a polyalkylene chain, such as polyethylene, polypropylene, or polyisobutylene. The sulfonic acid groups are attached to the aryl groups.

The aliphatic surfactants have an —OSO$_3$M or —COOM group or groups, attached to an aliphatic chain. The aliphatic chain has from eight to about thirty carbon atoms, preferably from twelve to about eighteen carbon atoms, but it can also be a high polymer chain having a molecular weight from upwards of 100 to 10,000 or more, preferably from 500 to 5,000.

Exemplary aromatic surfactants are the sodium polypropylene benzene sulfonates (U.S. Pat. No. 2,477,383 to Lewis), sodium keryl benzene sulfonates (derived from condensation of kerosene and benzene), sodium xylene sulfonate, sodium toluene sulfonate, sodium poly(methylene naphthalene) sulfonate, sodium dodecyl naphthalene sulfonate, sodium polypropylene naphthalene sulfonate, and sodium keryl naphthalene sulfonate.

Exemplary aliphatic surfactants are sodium lauryl sulfate, sodium stearyl sulfate, and sodium palmityl sulfate.

A special class are the polymeric acids, having a long carbon chain including a plurality of COOM groups. These are known compounds, and are described fully in Pat. No. 3,190,868, column 2, line 25, to column 3, last line, the disclosure of which is hereby incorporated by reference. Exemplary are sodium polyacrylate, sodium polymethacrylate, sodium salts of acrylic acid-styrene copolymers, sodium salts of methacrylic-acid butadiene copolymers, sodium salts of diisobutylene-maleic acid copolymers, sodium salts of partially hydrolyzed polyacrylic acid esters, such as polymethyl acrylate, and polymethacrylic acid esters, such as polymethyl methacrylate, sodium salts of maleic acid-1-butene copolymers, sodium salts of fumaric acid-1-pentene copolymers, and sodium salts of ethyl maleic acid-1-octene copolymers.

The potassium salts of these surfactants can also be used, but are more expensive. Ammonium salts can be used, and will form the alkali metal salts in situ; so also will the free acid form of these surfactants.

The anionic surfactant can be used in an amount within the range from about 0.02 to about 2% by weight of the rubbery polymer. Preferably, from about 0.05 to about 0.5% is used.

The nonionic surfactant is of the polyoxyalkylene glycol type, and the term "polyoxyalkylene glycol" encompasses the polyoxyalkylene glycols and their condensation products with other alkylene oxide-reactive or alkylene glycol-reactive organic compounds, including phenols, amines, oxides, amides, and ethers as used herein.

Certain nonionic surfactants are more active than others. The preferred nonionic emulsifiers have a water-insoluble nucleus of a polyoxyalkylene glycol other than ethylene glycol, with a molecular weight of more than 900, which has been extended with water-soluble polyoxyethylene groups at each end. The water-soluble portion of the molecule should constitute at least 50% by weight of the total. The polyoxyalkylene glycol can be aliphatic, aromatic or alicyclic in nature, can be saturated or unsaturated, and can be represented by the formula:

$$HO(C_2H_4O)_y(C_mH_nO)_x(C_2H_4O)_yH$$

wherein $x$, $y$, $m$ and $n$ are integers. When $(C_mH_nO)_x$ is saturated aliphatic, $n=2_m$.

Compounds in this class are described in U.S. Pats. Nos. 2,674,619 to Lundsted, dated Apr. 6, 1954 and 2,677,700 to Jackson et al., dated May 4, 1954.

The polyoxyalkylene compounds of No. 2,674,619 are defined by the formula:

$$Y[(C_3H_6O)_n\text{—E—H}]_x$$

where

Y is the residue of an organic compound containing therein $x$ active hydrogen atoms, $n$ is an integer, $x$ is an integer greater than 1.

The values of $n$ and $x$ are such that the molecular weight of the compound, exclusive of E, is at least 900, as determined by hydroxyl number, E is a polyoxyalkylene chain wherein the oxygen/carbon atom ratio is at least 0.5, and E constitutes at least 50% by weight of the compound.

The polyoxyalkylene compounds of No. 2,677,700 are defined by the formula:

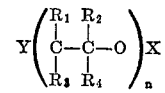

wherein Y is the residue of an organic compound containing therin a single hydrogen atom capable of reacting with a 1,2-alkylene oxide. $R_1$, $R_2$, $R_3$ and $R_4$ are selected from the group consisting of H, aliphatic radicals and aromatic radicals, at least one substituent being a radical other than hydrogen, $n$ is greater than 6.4 as determined by hydroxyl number and X is a water-solubilizing group which is nonionic and constitutes at least 50% by weight of the total compound.

The compounds of Pat. No. 2,674,619 are sold commercially by the Wyandotte Chemicals Corporation under the trademark "Pluronic." The following are examples of compounds corresponding to the formula:

| Name | Molecular weight polyoxy-propylene base | Ethylene oxide content in final product, weight percent | Molecular weight of final product |
|---|---|---|---|
| Pluronic L-61 | 1,750 | 10 | 1,940 |
| Pluronic L-62 | 1,750 | 20 | 2,190 |
| Pluronic L-63 | 1,750 | 30 | 2,500 |
| Pluronic F-68 | 1,700 | 80 | 8,750 |
| Pluronic P-75 | 2,050 | 50 | 4,100 |
| Pluronic F-88 | 2,250 | 80 | 11,250 |
| Pluronic F-98 | 2,700 | 80 | 13,500 |
| Pluronic F-108 | (¹) | 80 | 12,000–22,000 |

¹ Approximately 3,400.

Another group of emulsifiers that can be employed has a water-soluble nucleus with a molecular weight of at least 900 containing an organic compound having a plurality of reactive hydrogen atoms condensed with an alkylene oxide other than ethylene oxide and having water-soluble polyoxyethylene groups attached to each end. The weight percent of the hydrophilic portion of the molecule should be at least 50. This type of emulsifier is available commercially under the trademark "Tetronic." These ethylene oxide adducts of an aliphatic diamine such as ethylene diamine extended with propylene oxide have the following formula:

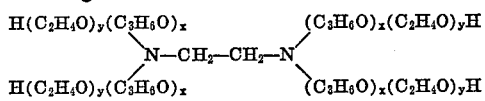

Compounds in this class are described in U.S. Pats. Nos. 2,674,619 and 3,250,719 and are sold commercially by the Wyandotte Chemicals Corporation under the trademark "Tetronic." The following are examples of compounds corresponding to the above formula:

| Name | Molecular weight for ethylene diamine-propylene oxide base | Ethylene oxide content in product, weight percent | Molecular weight of final product |
|---|---|---|---|
| Tetronic 707 | 3,000 | 75 | 12,000 |
| Tetronic 908 | 4,050 | 85 | 27,000 |

Other compounds in this class include ethylene oxide adducts of polyhydroxy alcohols extended with alkylene oxide, ethylene oxide adducts of polyoxyalkylene esters of polybasic acids, ethylene oxide adducts of polyoxyalkylene extended amides of polybasic acids, ethylene oxide adducts of polyoxyalkylene extended alkyl, alkenyl and alkynyl aminoalkanols, of which the hydrophobic nucleus should have a molecular weight of at least 900 and the hydrophilic part of the molecule should be at least 50% by weight of the total. It is to be understood that the above-mentioned organic compounds having a plurality of active hydrogen atoms as well as the polyoxyalkylene glycols can be aliphatic, aromatic or alicyclic in nature and can contain unsaturation.

Such compounds can be of the following formulae ($m$, $n$, $x$ and $y$ are as above):

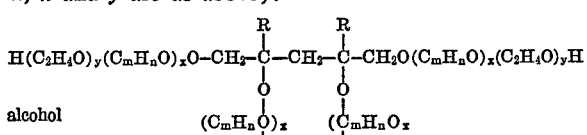

alcohol

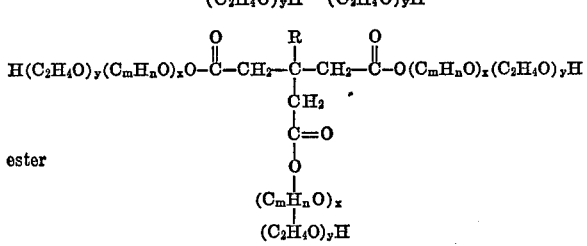

ester

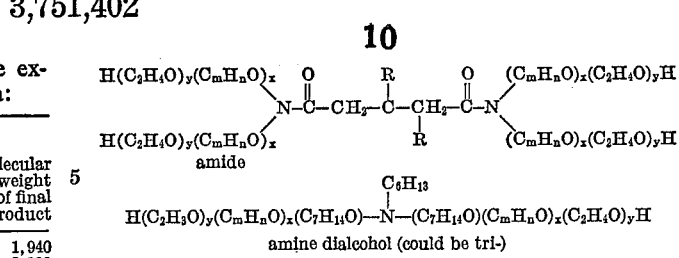

A third group of nonionic emulsifiers that can be employed includes high molecular weight polyoxyethylene adducts of hydrophobic organic compounds having one active hydrogen, such as aliphatic, saturated or unsaturated alcohols having at least eighteen carbon atoms; mono- or di-substituted alkyl, alkenyl or alkynyl aromatic or alicyclic alcohols of at least fifteen carbon atoms; mono- basic aliphatic, saturated or unsaturated aromatic or alicyclic monobasic hydroxy acid derivatives such as N-alkyl, -alkenyl or -alkynyl amides or alkyl, alkenyl or alkynyl esters of at least eighteen carbon atoms; alkyl, alkenyl or alkynyl glycol monobasic acid esters of at least eighteen carbon atoms; or di-N-alkyl, -alkenyl or -alkynyl (aromatic or alicyclic) aminoalkanols having at least eighteen carbon atoms. The hydrophilic portion of these molecules should be at least 50% by weight of the total. Such compounds can have the following formulae ($m$, $n$, $x$, and $y$ are as above):

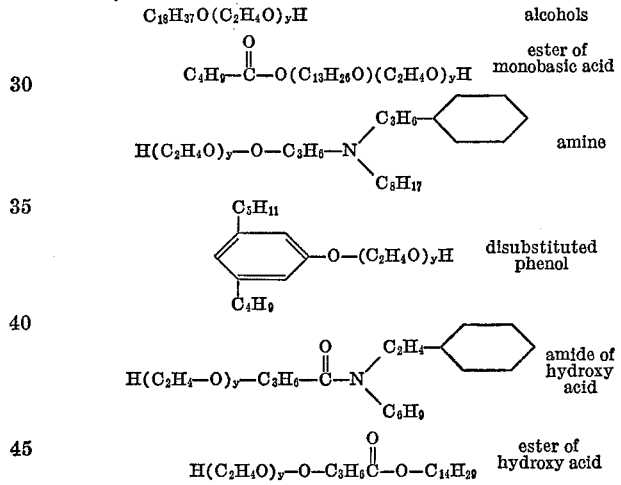

The nonionic surfactant is used in an amount within the range from about 0.02 to about 2% by weight of the rubbery polymer. Preferably, from about 0.05 to about 0.5% by weight of the rubbery polymer is used.

The anionic surfactant aids in the formation of the polymer crumb composed of hard, non-sticky well-shaped particles. The nonionic surfactant improves the effectiveness of the anionic surfactant in this respect, in addition to suppressing the foaming of the crumb slurry (which tends to be enhanced by the anionic surfactant in the presence of the basic hydrolysis product) during steam stripping and subsequent processing steps.

Subsequent to the formation of the rubbery crumb dispersion in water, the crumb must be dried and freed from any remaining small amounts of solvents, any relatively nonvolatile monomer, such as styrene, and other additives present in the reaction zone.

The rubber crumb is first separated from the water dispersant by running the suspension through a screen. The crumb may be water washed to leach out any residual surfactant and water-soluble salts present in the crumb. The polymer crumb from the screen can then be brought to an expeller, which by means of screw compression reduces the water content to below approximately 15%. The remaining water and any solvent can be removed by flashing, compressing the rubber in an expander, so as to heat it, and then releasing the pressure suddenly so that water as steam and solvent flash off. The water is separated, and some is recycled, while some is purged, since this wash water contains salts and build up of salts must be avoided. The final product from the expander can be baled, and is ready for distribution and/or use.

Figure 1:
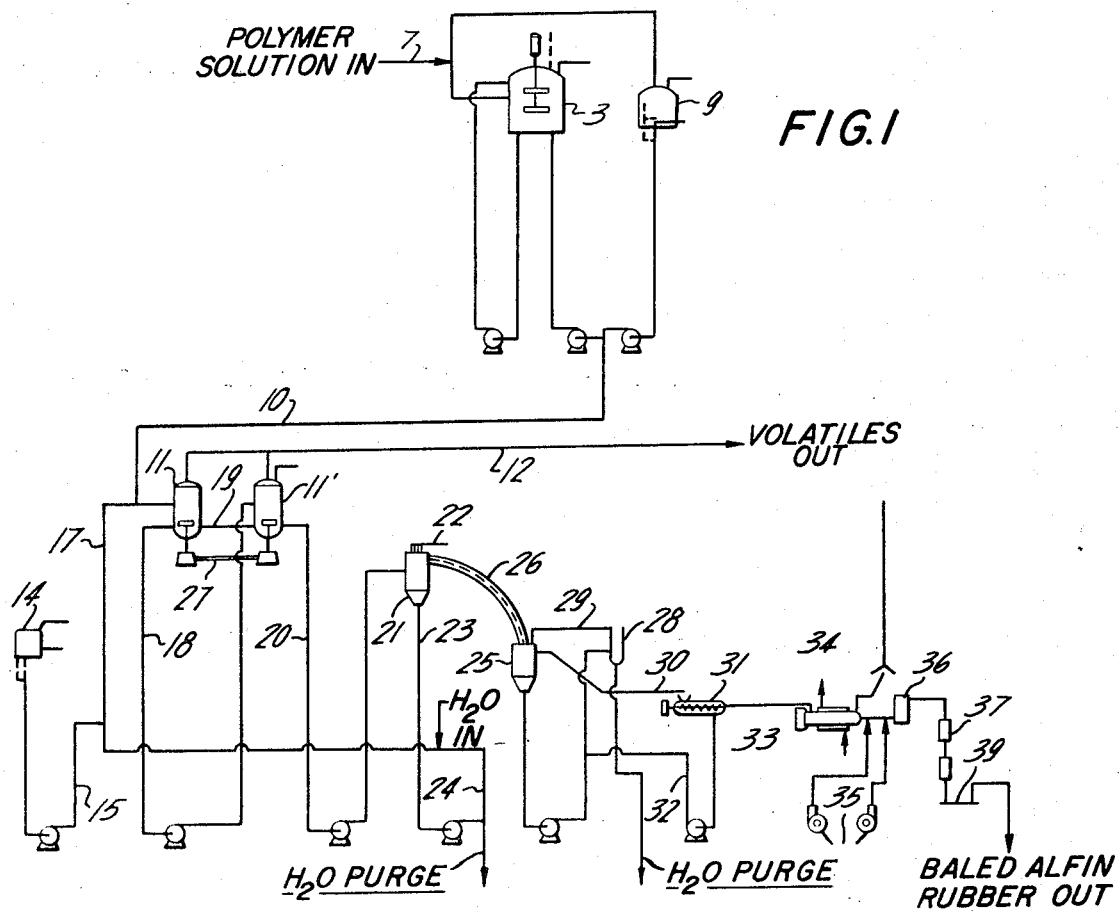
FIG. 1 shows a crumb-forming system which can be operated continuously or on a batch basis for preparing rubbery polymer crumb.

Rubber cement, for example alfin rubber cement, containing approximately 7 to 15 weight percent rubber from the polymerizer reactors flows via line 7 to the alfin cement blend tank 8. Anionic surfactant and nonionic surfactant are added at tank 8. The blend is continuously charged to the first of two solvent strippers, 11, 11'. It is mixed with hot recycled water entering via line 17 so that a suspension of alfin cement in water results. The resultant mixture which has a pH of 10 to 14 enters the solvent stripper 11, a vessel equipped with a stirrer 27 and overhead collection line 12 running to condenser-fractionator for recycling the solvent, if desired. The water is hot enough to flash some of the solvent. Steam is injected via line 19 to effect a steam distillation, and heat the mixture to a temperature of about 205° F., while the mixture is stirred. Substantially no foam forms, while solvent vapors escape via line 12. A slurry of alfin rubber crumb results, and the crumb is in the form of discrete, well-formed, hard particles, due to the presence of surfactant. The rubber slurry is removed from below and is sent via line 18 to the second stage solvent stripper 11', which is similar to the first stage. Most of the solvent is removed in the first stage, and the rubber entering the second stage has for example a solvent content of the order of 5 to 10 weight percent, based on the alfin rubber content.

Stripper 11' operates at a temperature of at least 212° F. and preferably between 220° F. and 230° F. under a slight positive pressure. Steam is also injected directly into this vessel via line 19. Substantially no foam forms. An aqueous slurry of alfin rubber of the order of 2 to 6 weight percent rubber is withdrawn via line 20. The solvent content of the rubber at this point is of the order of 1 weight percent, based on the alfin rubber.

The product vapor stream in line 12 contains the uncondensed steam and essentially all the hydrocarbons that were present with the exception of the rubber. In addition, it contains propylene, formed by decomposition of the alfin catalyst with water to form sodium hydroxide. It also contains isopropyl alcohol, formed by hydrolysis of the sodium isopropoxide. The rubber crumb contains a small amount of solvent. The quantity of solvent in the crumb at this stage should be kept to a minimum by appropriate adjustment of the steam stripping conditions.

The slurry from line 20 enters a separator 21 equipped with a mechanical rake 22, so that rubber crumb which floats to the surface of this vessel can be skimmed off. The alkaline water in the lower portion of this vessel, relatively free of rubber crumb, is recycled to stripper 11 via lines 23, 24, 17. In addition, to prevent buildup of salts, a proportion is purged, and replaced by make-up water which enters at line 24.

The rubber crumb which is present in the form of small particles and contains approximately 60 weight percent water and which is raked out enters a dewatering screen separator 25 via a chute 26. In the chute, the rubber crumb is contacted with a stream of water. The addition of water at this point reduces the residual surfactant and the salt content of the rubber crumb. The underflow from the screen consists essentially of water containing a small amount of rubber fines, and is withdrawn and pumped to a secondary fines settler 28. Rubber crumb is allowed to overflow from the upper portion of this vessel, and passes via line 29 back on to the screen separator 25. The underflow consists of water containing dissolved salts, and is purged.

The alfin rubber crumb discharged from the separator 25 is fed by conveyor 30 to an expeller 31. The expeller by means of screw compression reduces the water content from approximately 60% to less than approximately 15 weight percent. The water discharged from the expeller is returned to the fines settler 28, via ilne 32. The rubber from the expeller passess through line 33 and enters an expander 34. Here, by compression, and jacket-heating, the rubber is heated, so that upon discharge water as steam and solvent flash off. A stream of hot purge air to carry away water vapors and any solvent to prevent condensation in the crumb is provided by blowers 35. The alfin rubber at this point in the form of crumb is conveyed to a crumb conveyor and cooler 36 and subsequently to a baler 37 where it can be packaged in 75 pound bales. These are conveyed via conveyer 39 to storage. The solvent and other volatiles removed at the expander are vented.

Figure 2:
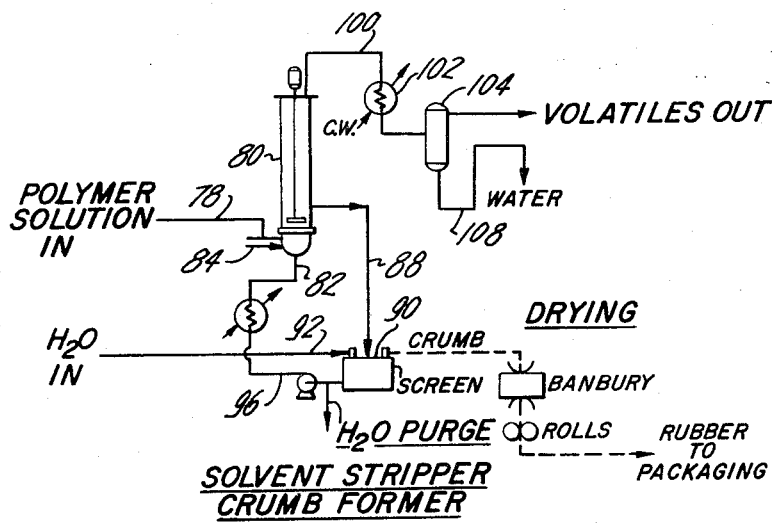
FIG. 2 shows a crumb-forming system which can be operated on a continuous or on a batch basis for preparing rubbery polymer crumb.

FIG. 2 shows another embodiment of a steam stripping system useful for the continuous or batch formation of a rubbery polymer crumb.

The rubbery polymer solution, for example, an alfin polymer prepared from an alfin sodium catalyst, is fed from the reaction zone to solvent stripper 80 through line 78. Hot water containing anionic surfactant and nonionic surfactant, and steam are passed into the solvent stripper 80 through lines 82 and 84, respectively. The operation of the solvent stripper is such as to result in continuous vaporization of the solvent by mixing of the polymer solution in hot water while simultaneously steam distilling the solvent, thereby forming an alkaline slurry of pH 10 to 14 of the polymer crumb in water. Substantially no foam is formed. In the embodiment shown, the polymer crumb which is in the form of discrete, well-formed, hard particles due to the presence of the surfactants, overflows at the liquid operating level of the solvent stripper 80, which may be adjusted to provide the retention time required to completely remove the solvent. The crumb is withdrawn through overflow pipe 88 to a screening operation.

The crumb-water slurry passing through overflow pipe 88 is sent to product screen tank 90 into which wash water is also passed through line 92. The water is withdrawn from tank 90 via line 96, and part is recycled to the solvent stripper 80 and part is purged. The washed polymer crumb is removed from the screen tank 90, and may then be passed through subsequent stages such as drying, milling packaging.

The amount of solvent used in the process of the invention is considerable, and obviously such quantity of solvent cannot be lost and still maintain an economically feasible operation. Accordingly, solvent distilled from solvent stripper 80 and containing some water is passed through line 100 and condenser 202 to the solvent-water separator 204. In this separator the heavier water phase settles to the bottom and is passed through line 208 to waste, while solvent liquid is passed through for further treatment and recycling.

The following examples in the operation of the inventors represent preferred embodiments of their invention.

EXAMPLE 1

A butadiene-isoprene copolymer was prepared in accordance with the following procedure.

An alfin catalyst was prepared as follows: 1950 pounds isooctane, 550 pounds of the 25% sodium dispersion in isooctane, and 120 pounds of isopropyl alcohol were mixed with agitation and cooling to maintain approximately 150° F. The alcohol was added over a three hour period. One-third of the sodium was thereby converted to sodium isopropoxide. Then, over a five hour period 190 pounds of butyl chloride was added, converting most of the remaining sodium to equimolar quantities of sodium butyl and sodium chloride. After addition of the butyl chloride was complete, the reaction was completed by stirring for a further hour.

Next, 95 pounds of propylene was added, converting sodium butyl to sodium allyl, with the formation of butane as a byproduct. This was retained in the system. See Example 1 of U.S. Pat. No. 3,223,691 for the procedure for preparing sodium alfin catalysts.

Catalyst thus prepared was fed to the first reactor of a multiple stage reaction zone at a rate of 240 pounds per hour. Dry butadiene was charged continuously at a rate of 480 pounds per hour, and dry isoprene at a rate of 120 pounds per hour. 1,4-dihydronaphthalene was added as a moderator at a rate of 3.5 pounds per hour, and isooctane was fed in at approximately 100° F.

The six reactors were each maintained at a reaction temperature of 130 to 140° F. and were operated liquid full. The pressure in the reactors was 50 p.s.i.g. The reaction mixture was fed in sequence from reactor to reactor, and the total travel and reaction time through the entire series of six was five hours.

The polymerizer effluent containing 10 weight percent alfin rubber at 140° F., was blended with 0.25% Tamol SN (sodium poly (methylene naphthalene) sulfonate) by weight of polymer and with 0.25% Pluronic L-61 (polyoxypropylene oxyethylene glycol) and then (referring to FIG. 1), was fed through line 10 at a rate of 5100 pounds per hour to the first solvent stripper 11, where it was blended with two and one-half times its volume of hot water at 190° F. Steam at a rate of 10 lbs./lb. was injected to heat the suspension to a temperature of 220° F. while the mixture was intensely agitated. Substantially no foam formed. The isooctane flashed off, together with butadiene, isoprene, isopropanol, and propylene. Approximately 95% of the total solvent was removed in the first stripper. The vapor streams in line 12 amounted to approximately 4100 pounds per hour. Isooctane and butadiene and isoprene were removed overhead, dried, condensed, separated and recycled.

An approximately 5 weight percent rubber crumb slurry in water resulted having a pH of 11. The crumb was in the form of hard discrete particles, which showed no tendency to stick to each other or to the equipment. The crumb was drawn off at the bottom of the stripper 11 via line 18, and was sent to the second stage solvent stripper or crumb former 11'. where the steam distillation was repeated. Again, substantially no foam was formed. The solvent content of the crumb at the beginning of this stage was approximately 10 weight percent, based on the rubber content. The aqueous slurry of rubber emerging from this crumb former had the solvent content reduced to 1 weight percent. The vapor stream in line 12 contained essentially all of the hydrocarbons originally present with the crumb, and in addition propylene and isopropyl alcohol formed by hydrolysis of the catalyst. The rubber crumb contained only small amounts of molecular weight moderator and solvent.

The crumb slurry from the solvent stripper 11' passed through the screen separator 22, removing rubber crumb which floated to the surface of the vessel. The liquid in the lower portion was recycled to the first crumb former 11.

The rubber crumb in the form of small, hard particles containing approximately 60 weight percent water was raked off, and entered the dewatering screen 26, where it was contacted with a stream of cold water at a rate of approximately 13 gallons per minute. This cooled the crumb, prevented clogging of the screen, and reduced salt content. The underflow, consisting of water and a small amount of rubber fines, was pumped to the fines settler 25, where the rubber crumb overflowed from the upper portion of the vessel back on to the screen 26. The underflow was purged. The rubber crumb discharged from the screen was fed by the conveyor 30 to the expeller 31, which reduced the water content by screw compression from 60% to less than approximately 15%. The rubber crumb then entered the expander 34 where, by compression at several hundred p.s.i., the rubber was heated to approximately 330° F., so that upon discharge from the expander, water as steam and solvent flashed off. The product was then baled in the baler 37, and was ready for distribution. The product had a molecular weight of approximately 200,000, Mooney value 50.

The above procedure is repeated, but omitting the 0.25% Pluronic L-61. The rubber crumb is satisfactory. However, the stripper is filled with foam which substantially reduces the output of the system.

EXAMPLE 2

Butadiene-isoprene and butadiene-styrene copolymers were prepared under the conditions shown in the table which follows. 1,4-dihydronaphthalene was utilized as the molecular weight moderator, and fed to the reactor at the rate shown, to yield a polymer with the Mooney value at from 75 to 90. Additional isooctane was added so that the final concentration of alfin polymer would be about 8 to 8.5 percent. The reaction mixture was stripped using the apparatus of FIG. 2.

A solution was formed of Tamol 731 (sodium salt of the copolymer of maleic anhydride and diisobutylene) and Pluronic L-61 (polyoxypropylene oxyethylene glycol) in the hot water fed into the steam stripper 80, (referring to FIG. 2) sufficient to provide 0.25% Tamol 731 and 0.25% L-61 by weight of the alfin polymer. The crumb slurry had a pH of about 12. Foaming was suppressed, and a hard, small-particle crumb resulted.

Operating for varying days and periods of time each day, preparing butadiene-styrene and butadiene-isoprene copolymers, the conditions and results as shown in the following Tables I and II were obtained:

TABLE I.—PRODUCTION SUMMARY DATA—80% BUTADIENE, 20% ISOPRENE

| | Day | | | | | |
|---|---|---|---|---|---|---|
| | 1 | 2 | 3 | 4 | 5 | Total |
| Hour on stream | 22.0 | 24.0 | 24.0 | 24.0 | 17.0 | 111.0 |
| Butadiene fed, lbs | 272 | 281 | 278 | 278 | 214 | 1,323 |
| Average feed rate, lbs./hr | 12.34 | 11.72 | 11.58 | 11.58 | 12.60 | 11.91 |
| Isoprene fed, lbs | 73.2 | 68.4 | 75.2 | 70.4 | 54.0 | 341 |
| Average feed rate, lbs./hr | 3.33 | 2.85 | 3.13 | 2.93 | 3.17 | 3.07 |
| Total monomers fed, lbs | 345 | 350 | 353 | 348 | 268 | 1,664 |
| Average feed rate, lbs./hr | 15.7 | 14.6 | 14.7 | 14.5 | 15.8 | 15.0 |
| Butadiene, isoprene ratio | 78.8:21.3 | 80.4:19.6 | 78.7:21.3 | 79.8:20.2 | 79.9:20.1 | 79.5:20.5 |
| Catalyst fed, lbs | 110 | 138 | 152 | 136 | 112 | 648 |
| Average feed rate, lbs./hr | 5.00 | 5.75 | 6.34 | 5.67 | 6.57 | 5.84 |
| Average lbs. catalyst/lb. monomer | 0.37 | 0.39 | 0.43 | 0.39 | 0.42 | 0.39 |
| 1,4-dihydronaphthalene fed, lbs | 0.92 | 0.92 | 1.02 | 0.92 | 0.58 | 4.36 |
| Average feed rate, lbs./hr | 0.042 | 0.038 | 0.042 | 0.038 | 0.024 | 0.039 |
| Average lbs. 1,4-dihydronaphthalene/lb. monomer | 0.0031 | 0.0026 | 0.0029 | 0.0026 | 0.0022 | 0.0026 |
| Isooctane C fed, lbs | 3,195 | 3,466 | 3,737 | 3,554 | 2,581 | 16,533 |
| Average feed rate, lbs./hr | 145 | 144 | 156 | 148 | 152 | 149 |
| Total feed to reactors, lbs | 3,572 | 3,856 | 4,134 | 3,942 | 2,881 | 18,386 |
| Monomers fed, percent of total feed | 8.25 | 9.07 | 8.54 | 8.83 | 9.21 | 9.05 |
| Average reactor temperature, ° F.: | | | | | | |
| No. 1 | 91 | 91 | 91 | 90 | 91 | 91 |
| No. 2 | 128 | 134 | 134 | 132 | 135 | 135 |
| No. 3 | 126 | 135 | 133 | 131 | 134 | 132 |
| No. 4 | 126 | 137 | 135 | 133 | 137 | 134 |
| No. 5 | 108 | 118 | 114 | 111 | 115 | 113 |
| Rubber recovered, lbs | | | | | | 1,433 |
| Yield, percent | | | | | | 66.1 |
| Mooney range | | | | | | 75.90 |

TABLE II.—PRODUCTION SUMMARY DATA—85% BUTADIENE, 15% STYRENE

| | Day | | | | | |
|---|---|---|---|---|---|---|
| | 1 | 2 | 3 | 4 | 5 (6) | Total |
| Hours on stream | 22.6 | 22.5 | 24.0 | 20.7 | 28.0 | 117.8 |
| Butadiene fed, lbs | 254 | 262 | 292 | 251 | 318 | 1,377 |
| Average feed rate, lbs./hr | 11.25 | 11.64 | 12.15 | 12.15 | 11.37 | 11.69 |
| Styrene fed, lbs | 43.8 | 43.9 | 46.0 | 38.6 | 50.1 | 222.4 |
| Average feed rate, lbs./hr | 1.94 | 1.95 | 1.92 | 1.87 | 1.79 | 1.89 |
| Total monomers fed, lbs | 298 | 306 | 337 | 289 | 368 | 1,599 |
| Average feed rate, lbs./hr | 13.19 | 13.59 | 14.07 | 14.02 | 13.16 | 13.58 |
| Butadiene-styrene ratio | 85.3:14.7 | 85.7:14.3 | 86.4:13.6 | 86.7:13.3 | 86.4:13.6 | 86.1:13.9 |
| Catalyst fed, lbs | 107 | 112 | 130 | 132 | 134 | 615 |
| Average feed rate, lbs./hr | 4.73 | 4.97 | 5.43 | 6.39 | 4.78 | 5.23 |
| Average lbs. catalyst/lb. monomer | 0.36 | 0.37 | 0.39 | 0.46 | 0.36 | 0.38 |
| 1,4-dihydronaphthalene fed, lbs | 2.27 | 2.57 | 2.62 | 2.42 | 3.15 | 13.03 |
| Average feed rate, lbs./hr | 0.10 | 0.11 | 0.11 | 0.12 | 0.11 | 0.11 |
| Average lbs. 1,4-dihydronaphthalene/lbs. monomer | 0.0076 | 0.0084 | 0.0078 | 0.0084 | 0.0085 | 0.0081 |
| Isooctane fed, lbs | 2,923 | 2,805 | 2,911 | 2,436 | 3,085 | 14,249 |
| Average feed rate, lb./hr | 129 | 129 | 121 | 118 | 110 | 121 |
| Total feed to reactors, lb | 3,253 | 3,235 | 3,288 | 2,766 | 3,495 | 16,036 |
| Monomers fed, percent of total feed | 9.16 | 9.45 | 10.26 | 10.48 | 10.50 | 9.97 |
| Average reactor temperature, °F.: | | | | | | |
| No. 1 | 82 | 82 | 82 | 81 | 85 | 83 |
| No. 2 | 132 | 134 | 128 | 129 | 133 | 131 |
| No. 3 | 129 | 134 | 134 | 132 | 138 | 134 |
| No. 4 | 124 | 130 | 132 | 128 | 136 | 130 |
| No. 5 | 117 | 116 | 117 | 116 | 119 | 117 |
| Rubber recovered, lbs | | | | | | 1,400 |
| Yield, percent | | | | | | 87.5 |
| Mooney range | | | | | | 60–65 |

Having regard to the foregoing disclosure, the following is claimed as the inventive and patentable embodiments thereof:

1. In the continuous process for the preparation of alfin polymers from alfin polymerizable monomers, comprising continuously blending an organic unsaturated alfin polymerizable monomer, alfin catalyst, molecular weight moderator and solvent, to form a reaction mixture substantially free from polyvalent metal cations, continuously effecting the polymerization of alfin monomer at an elevated temperature, continuously separating volatile materials including unreacted monomer, volatile low polymer, and solvent from the alfin polymer reaction mixture by quenching the reaction mixture from the resulting dispersion, thereby forming an alfin polymer crumb and slurry in water having a pH of greater than 10, and thereafter recovering solvent and, if desired, monomer, for reuse, and washing and drying the alfin polymer, the improvement which comprises forming the crumb slurry in the presence of from about 0.02 to about 2% by weight of polymer of an alkali metal salt of an anionic surfactant having a hydrophobic portion of relatively high molecular weight and attached to the hydrophobic portion at least one hydrophilic group selected from the group consisting of —COOM; —OSO$_3$M; and —SO$_3$M groups, wherein M is an alkali metal or ammonium; the hydrophobic portion being selected from the group consisting of aromatic; aliphatic; and aliphatic-substituted aromatic groups in which the aliphatic group has from about one to about thirty carbon atoms; sufficient to obtain a dispersion of hard, discrete crumb particles of the rubbery polymer in water, and to foam the alkaline aqueous phase during the steam-stripping, and a nonionic surfactant selected from the group consisting of polyoxyalkylene glycols and their condensation products with alkylene oxide-reactive and alkylene glycol-reactive organic compounds selected from the group consisting of phenols, amines, alkylene oxides, amides and ethers in an amount from about 0.02 to about 2% by weight of the polymer to suppress the formation of foam during the steam-stripping.

2. The process of claim 1 wherein the anionic surfactant is an alkali metal poly(methylene naphthalene) sulfonate having a molecular weight from 100 to about 10,000, the naphthalene groups being linked in a polymeric chain by the methylene groups, and the sulfonate groups being linked to the naphthalene groups.

3. The process of claim 1 wherein the nonionic surfactant is a polyoxyethyleneoxypropylene glycol having the formula HO(C$_2$H$_4$O)$_y$(C$_m$H$_n$O)$_x$(C$_2$H$_4$O)$_y$H wherein $x$, $y$, $m$, and $n$ are integers, and when (C$_m$H$_n$O) is saturated aliphatic, $n$ is $2_m$.

4. The process of claim 1 wherein the polymer concentration in the reaction mixture is within the range of from about 2 to about 25 weight percent.

5. The process of claim 1 wherein the rubbery polymer solution contains an alfin catalyst in an amount sufficient to increase the pH of the aqueous phase to from about 11 to about 14 when hydrolyzed by water during the steam-stripping.

6. The process of claim 1 wherein the nonionic surfactant is a sodium salt of a copolymer of di-isobutylene and maleic anhydride.

7. The process of claim 1 wherein the anionic surfactant is an alkali metal poly(methylene naphthalene) sulfonate having a molecular weight from 100 to about 10,000, the naphthalene groups being linked in a polymeric chain by methylene groups, and the sulfonate groups being linked to the naphthalene groups, and the nonionic surfactant is a polyoxyethyleneoxypropylene glycol having the formula HO(C$_2$H$_4$O)$_y$(C$_3$H$_6$O)$_x$(C$_2$H$_4$O)$_y$ wherein $x$, $y$, $m$, and $n$ are integers.

8. A process in accordance with claim 1 in which the alfin catalyst comprises a sodium compound of a methyl n-alkyl carbinol and a sodium alkenyl compound.

9. The process of claim 8, wherein the alfin catalyst is sodium allyl-sodium isopropoxide-sodium chloride.

10. The process of claim 1 wherein the polymer is a homopolymer of butadiene.

11. The process of claim 1 wherein the polymer is a copolymer of butadiene and isoprene.

12. The process of claim 1 wherein the polymer is a homopolymer of isoprene.

13. The process of claim 1 wherein the polymer is a copolymer of butadiene and styrene.

14. The process of claim 1 wherein the steam-stripping is carried out at a temperature within the range of from about 80 to about 120° C.

15. A process in accordance with claim 1 in which the rubbery polymer solution is mixed with hot water at from about 80 to about 100° C. which causes the separation of volatile materials from the alfin polymer solution.

(References on following page)

References Cited

UNITED STATES PATENTS

| | | | |
|---|---|---|---|
| 3,042,637 | 7/1962 | Crouch | 260—17.5 |
| 3,258,453 | 6/1966 | Chi | 260—82.1 |
| 3,268,501 | 8/1966 | Crouch et al. | 260—94.7 |
| 3,640,978 | 2/1972 | Baba | 260—82.1 |

JOSEPH L. SCHOFER, Primary Examiner

W. F. HAMROCK, Assistant Examiner

U.S. Cl. X.R.

260—85.1, 83.3, 94.2, 83.5, 94.7, 85.3, 96, 93.5, 92.3, 92.1